(12) United States Patent
Sakai

(10) Patent No.: US 11,249,009 B2
(45) Date of Patent: Feb. 15, 2022

(54) DIAGNOSTIC DEVICE, DIAGNOSTIC SYSTEM, DIAGNOSTIC METHOD, AND COMPUTER-READABLE RECORDING MEDIUM

(71) Applicant: NEC Corporation, Tokyo (JP)

(72) Inventor: Jun Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 514 days.

(21) Appl. No.: 16/079,627

(22) PCT Filed: Mar. 3, 2017

(86) PCT No.: PCT/JP2017/008435
§ 371 (c)(1),
(2) Date: Aug. 24, 2018

(87) PCT Pub. No.: WO2017/154761
PCT Pub. Date: Sep. 14, 2017

(65) Prior Publication Data
US 2019/0056308 A1 Feb. 21, 2019

(30) Foreign Application Priority Data
Mar. 10, 2016 (JP) .............................. JP2016-047002

(51) Int. Cl.
*G01N 19/08* (2006.01)
*F17D 5/02* (2006.01)

(52) U.S. Cl.
CPC .............. *G01N 19/08* (2013.01); *F17D 5/02* (2013.01)

(58) Field of Classification Search
CPC ................................. G01N 19/08; F17D 5/02

USPC ........................................................... 702/34
See application file for complete search history.

(56) References Cited

U.S. PATENT DOCUMENTS

| 4,521,864 | A * | 6/1985 | Characklis | G01N 11/08 702/170 |
| 6,993,963 | B1 * | 2/2006 | Gudmundsson | E21B 47/06 73/152.52 |
| 7,240,537 | B2 * | 7/2007 | Di Lullo | G01N 13/00 73/49.5 |
| 2006/0272417 | A1 * | 12/2006 | Zanker | G01F 1/66 73/592 |
| 2006/0283251 | A1 | 12/2006 | Hunaidi et al. | |

(Continued)

FOREIGN PATENT DOCUMENTS

| JP | 2013-024574 A | 2/2013 |
| JP | 2013-061350 A | 4/2013 |
| JP | 2013-213535 A | 10/2013 |

OTHER PUBLICATIONS

Mirmanto, Effect of tube diameter and surface roughness on fluid flow friction factor, Jul. 2, 2014, ISSN 2088-088x.*

(Continued)

*Primary Examiner* — Aditya S Bhat
(74) *Attorney, Agent, or Firm* — Sughrue Mion, PLLC

(57) ABSTRACT

Provided are a diagnostic device and the like for easily diagnosing the condition of the interior of a pipeline. This diagnostic device is provided with: a frictional loss calculating unit which, on the basis of the pressure of a fluid in the pipeline, finds a pressure frictional loss; and a diagnosing unit which diagnoses the condition of the inner surface of the pipeline on the basis of the frictional loss.

15 Claims, 6 Drawing Sheets

(56) References Cited

U.S. PATENT DOCUMENTS

2013/0014593 A1    1/2013    Tabaru et al.
2014/0165731 A1    6/2014    Linford

OTHER PUBLICATIONS

International Search Report for PCT Application No. PCT/JP2017/008435, dated May 9, 2017.
English translation of Written opinion for PCT Application No. PCT/JP2017/008435.

* cited by examiner

DIAGNOSTIC DEVICE, DIAGNOSTIC SYSTEM, DIAGNOSTIC METHOD, AND COMPUTER-READABLE RECORDING MEDIUM

This application is a National Stage Entry of PCT/JP2017/008435 filed on Mar. 3, 2017, which claims priority from Japanese Patent Application 2016-047002 filed on Mar. 10, 2016, the contents of all of which are incorporated herein by reference, in their entirety.

TECHNICAL FIELD

The present invention relates to a diagnostic device, a diagnostic system, a diagnostic method and a computer-readable recording medium.

BACKGROUND ART

Piping facilities such as a water supply network are generally enormous in scale. Progress of deterioration of piping buried underground may differ depending on the acidity, electric potential or pressure or the like of a soil in which the piping is buried. Relatively new piping may deteriorate suddenly thus requiring early replacement with spare. Accordingly, there is a need for a technique to properly diagnose the state, such as a degree of deterioration, of piping, for the purpose of making repairs or replacement of the piping with spare efficiently and without delay.

PTL 1 describes a technique regarding non-destructive inspection of pipes. The technique described in PTL 1 measures a value representing the propagation speed of acoustic disturbance propagating between two points isolated from each other in the longitudinal direction of a pipe. A thickness parameter is calculated by adapting the measured value to a predictive value.

CITATION LIST

Patent Literature

[PTL 1] Japanese Patent Application Publication No. 2013-61350

SUMMARY OF INVENTION

Technical Problem

The approach described in PTL 1 determines a thickness or an inner diameter of piping. However, it is necessary to diagnose a state of an interior of piping in order to properly diagnose the state, such as deterioration, of the piping.

The present invention has been created for the purpose of solving the above problem and aims mainly to provide a diagnostic device or the like for easily diagnosing the state of the interior of piping.

Solution to Problem

An aspect of the invention is a diagnostic device. The diagnostic device includes friction loss calculation means for determining, based on a pressure of a fluid in piping, a friction loss of the pressure; and diagnosing means for diagnosing the state of the inner surface of the piping, based on the friction loss.

An aspect of the invention is a diagnostic method. The diagnostic method includes determining a friction loss of a pressure, based on the pressure of a fluid in piping and diagnosing the state of the inner surface of the piping, based on the friction loss.

An aspect of the invention a non-transitory computer-readable recording medium. The non-transitory computer-readable recording medium stores a program for executing on a computer. The computer determines, based on a pressure of a fluid in piping, a friction loss of the pressure; and diagnoses, based on the friction loss, the state of the inner surface of the piping.

Advantageous Effects of Invention

According to the invention, it is possible to provide a diagnostic device or the like for easily diagnosing the state of the interior of piping.

EXAMPLE EMBODIMENT

Figure 9:
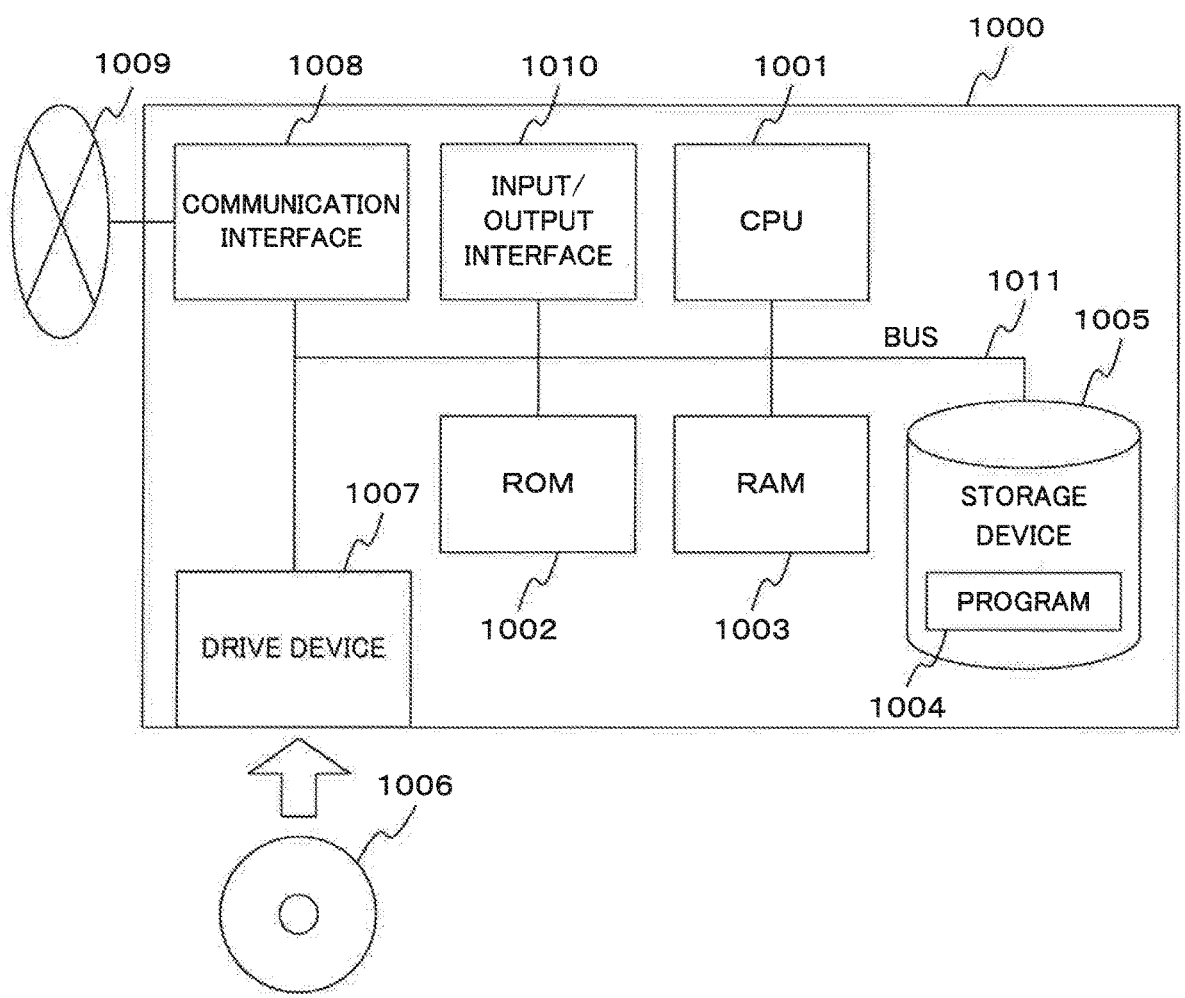
FIG. 9 illustrates an example of an information processing device that embodies a diagnostic device or the like according to an example embodiment of the invention.

Each of example embodiments of the invention will be described referring to attached drawings. In Each of example embodiments of the invention, each of components of a device or a system indicates a functional unit block. A part or a whole of each of the components of the device or the system is embodied, for example, by any combination of an information processing device 1000 and a program illustrated in FIG. 9. The information processing device 1000 includes an example configuration described below.

Central processing unit (CPU) 1001
Read only memory (ROM) 1002
Random access memory (RAM) 1003
Program 1004 loaded to RAM 1003

Storage device 1005 that stores the program 1004

Drive device 1007 that reads/writes from/to a recording medium 1006

Communication interface 1008 that connects to a communication network 1009

Input/Output interface 1010 that performs data input/output

Bus 1011 that interconnects components

Each of the components of the device in each of the example embodiments is embodied when the CPU 1001 acquires and executes the program 1004 that achieves functions of the components. The program 1004 that achieves the functions of the components of the device is stored previously, for example, on the storage device 1005 or RAM 1003 and read by the CPU 1001 as appropriate. The program 1004 may be supplied to the CPU 1001 via the communication network 1009 or stored previously on the recording medium 1006 and the drive device 1007 may read and supply the program to the CPU 1001.

A device may be embodied by way of a variety of variations. For example, the device may be embodied, for each component, by any combination of a separate information processing device 1000 and a program. A plurality of components of a device may be embodied by any combination of a single information processing device 1000 and a program.

A part or a whole of a component of a device is embodied by general-purpose or special-purpose circuitry, a processor or the like, or a combination thereof. The component may be configured with a single chip or a plurality of chips interconnected via a bus. A part or a whole of a component of a device may be embodied by a combination of the circuitry or the like and the program mentioned above.

When a part or a whole of a component of a device is embodied by a plurality of information processing devices or circuits or the like, the plurality of information processing devices or circuits or the like may be centralized or dispersed. For example, the information processing devices or circuits or the like may be embodied by a client and server system, a cloud computing system or any other configuration where an information processing device or a circuit is interconnected via a communication network.

In the following description of a diagnostic device or the like according to an example embodiment of the invention, the diagnostic device or the like diagnoses a water supply network that supplies clean water or a facility arranged in the water supply network. The target of control by the diagnostic device according to an example embodiment of the invention is not limited to a water supply network.

First Example Embodiment

A first example embodiment of the invention will be described below. Note that, in the following description, a "pressure of a fluid in piping" may be referred to as a "pressure in piping". A "decrease in a pressure of a fluid in piping due to friction" may be referred to as a "friction loss of a pressure" or a "friction loss of piping".

Figure 1:
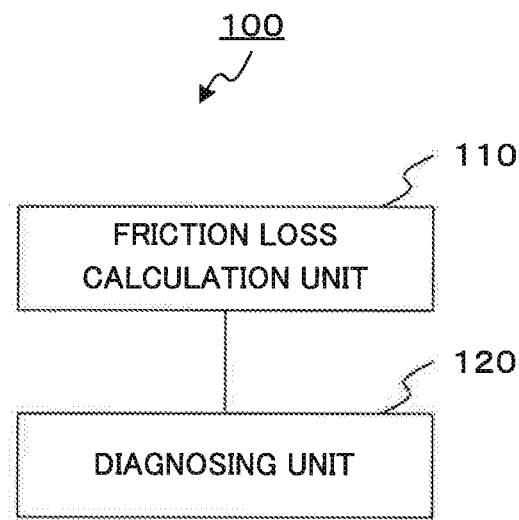
FIG. 1 illustrates a configuration of a diagnostic device according to a first example embodiment of the invention.
Figure 2:
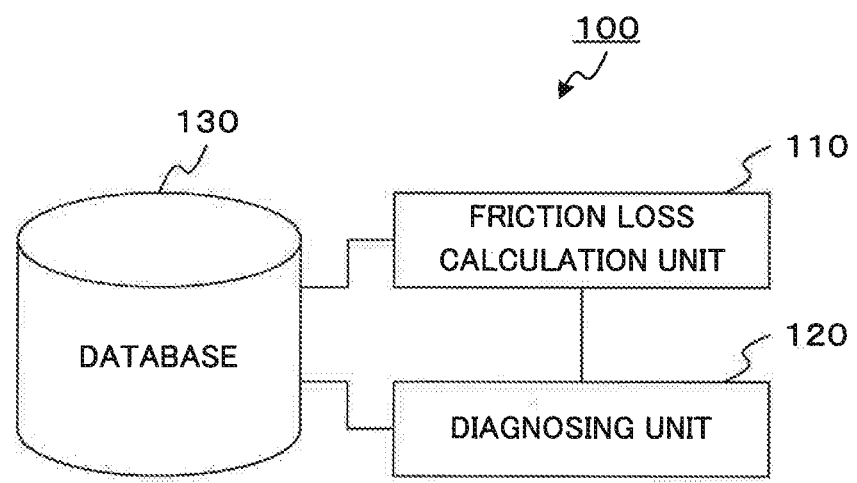
FIG. 2 illustrates another configuration of the diagnostic device according to the first example embodiment of the invention.

As illustrated in FIG. 1, a diagnostic device 100 according to the first example embodiment of the invention includes a friction loss calculation unit 110 and a diagnosing unit 120. The friction loss calculation unit 110 determines a friction loss of a pressure, based on the pressure of a fluid in piping. The diagnosing unit 120 diagnoses a state of the inner surface of the piping, based on the friction loss. As illustrated in FIG. 2, the diagnostic device 100 may include a database 130. The database 130 stores information indicating the friction loss determined by the friction loss calculation unit 110 or the result of the diagnosis made by the diagnosing unit 120.

Figure 3:
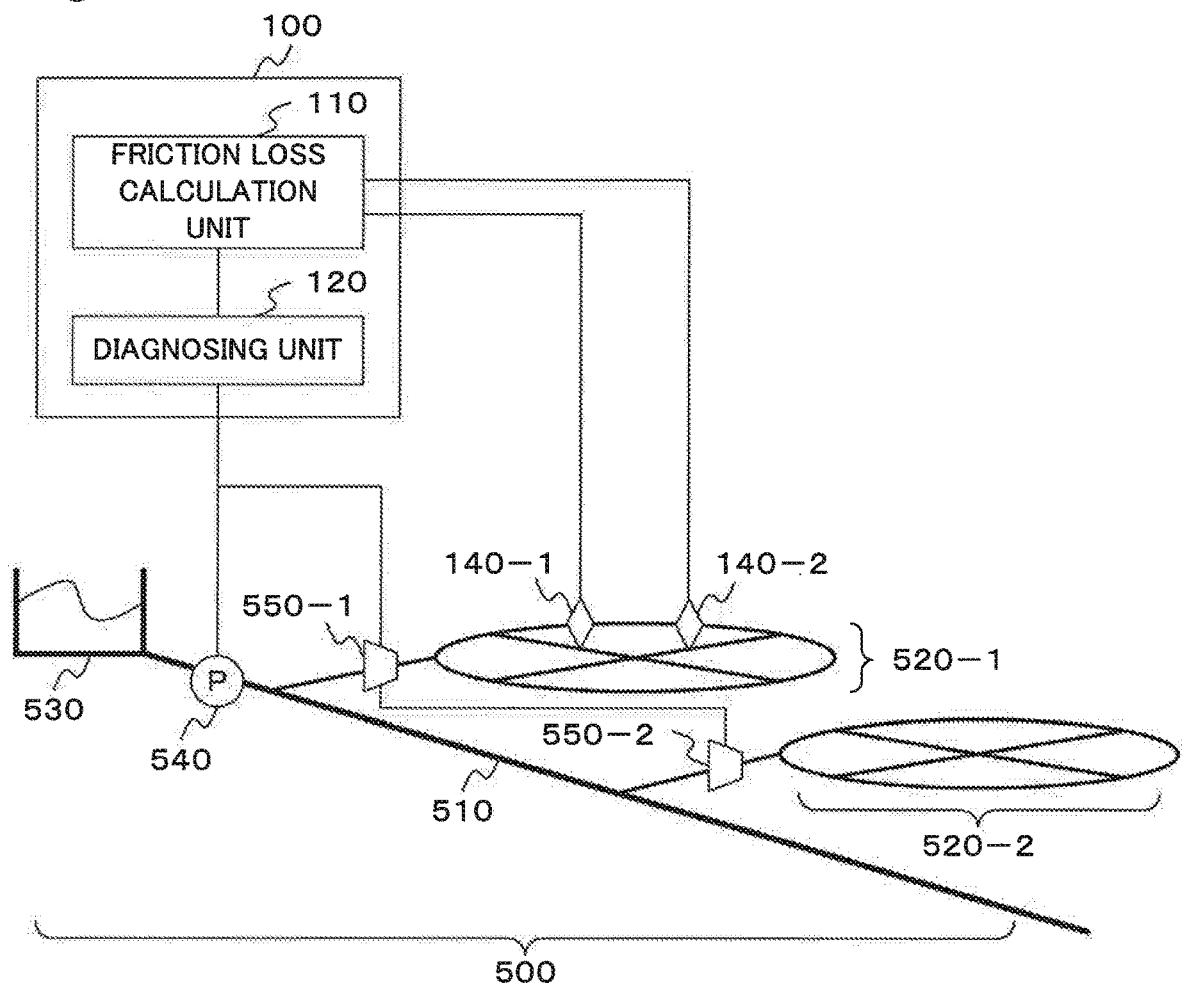
FIG. 3 illustrates an example in which the diagnostic device according to the first example embodiment of the invention is applied to a pipeline network of a water supply.

FIG. 3 illustrates an example where the diagnostic device 100 according to the example embodiment of the invention is applied to a pipeline network 500 as a water supply network. The pipeline network 500 illustrated in FIG. 3 consists mainly of a water main 510 and one or a plurality of water distribution blocks 520. In the example of the pipeline network 500 illustrated in FIG. 3, two water distribution blocks 520, a water distribution block 520-1 and a water distribution block 520-2, are connected to the water main 510. The water main 510 consists of a plurality of pipes.

The water main 510 supplies clean water acquired through purification by a water purification plant 530 to a water distribution block 520. As an example, the water main 510 is equipped with a pump 540. The water distribution block 520 supplies clean water as a fluid distributed from the water purification plant 530 via the water main 510 to a consumer as a water user. The water distribution block 520 consists of a plurality of pipes.

As an example, a point where the water main 510 connects to the water distribution block 520 is equipped with a valve 550. The valve 550 regulates the pressure of clean water in such a way that a water pressure or a pressure of clean water flowing through the water distribution block 520 will be maintained at a proper level. In the example illustrated in FIG. 3, a point where the water main 510 connects to the water distribution block 520-1 is equipped with a valve 550-1. A point where the water main 510 connects to the water distribution block 520-2 is equipped with a valve 550-2. Further, a water distribution block 520 may be equipped with a pump 540 or a valve 550 (not illustrated).

Piping that constitutes the water distribution block 520 is equipped with a pressure sensor 140. In the example illustrated in FIG. 3, the water distribution block 520-1 is equipped with a pressure sensor 140-1 and a pressure sensor 140-2. The pressure sensor 140 is mounted on a fire hydrant or the like in the pipeline network 500. The pressure sensor 140 measures a water pressure as a pressure of water flowing in piping and a temporal change in water pressure. Information regarding the water pressure measured by the pressure sensor 140 is used when the diagnostic device 100 determines a friction loss or the like as mentioned later.

The information regarding the pressure measured by the pressure sensor 140 is stored, as appropriate, on a database or a storage device or the like (not illustrated). In this example embodiment, the pressure sensor 140 is not limited in type or in structure but a pressure sensor 140 of any type or structure may be used. Note that the pressure sensor 140 preferably measures a pressure at a cycle that permits an analysis mentioned later. As an example, the pressure sensor 140 preferably measures a pressure at a cycle of 100 or more samples per second.

A point equipped with the pressure sensor 140 is not limited to the example illustrated in FIG. 3. In other words, any number of pressure sensors 140 may be arranged, as appropriate, in the water distribution block 520. A pressure sensor 140 may be arranged on the water main 510 in such a way that a water pressure in the water main 510 and a temporal change in the water pressure will be measured.

Next, a component of the diagnostic device 100 according to the first example embodiment of the invention will be described.

The friction loss calculation unit 110 determines a friction loss of a pressure of a fluid in piping, based on the pressure of water or the like in the piping. The friction loss of the pressure of the fluid in the piping represents a degree of a decrease in the pressure of water or the like caused by friction with an inner wall surface of the piping observed when water or the like flows in the piping. More particularly, the friction loss calculation unit 110 determines a friction loss of a pressure of a fluid in piping, based on a transient change in the pressure of the fluid such as water in the piping.

In an example embodiment, the transient change in the pressure of the fluid in the piping represents a sudden change in the pressure. The transient change in the pressure of the fluid in the piping is also called a water hammer. The pressure of the fluid such as water in the piping and the transient change in the pressure of the fluid are measured, for example, by the two pressure sensors, that is, the pressure sensors 140-1 and 140-2 illustrated in FIG. 3. The friction loss calculation unit 110 determines a friction loss of piping between points where two pressure sensors separately measure a pressure. In the example illustrated in FIG. 3, the friction loss calculation unit 110 determines a friction loss of piping between points where the pressure sensor 140-1 or 140-2 measures a pressure. Note that, when another pressure sensor 140 (not illustrated) is arranged in the pipeline network 500, the friction loss calculation unit 110 may determine a friction loss of piping at a point where the other pressure sensor 140 is arranged.

Sudden opening/closing of the valve 550, occurrence or collapse of an airlock in water in piping, for example in water flowing in piping, or sudden opening/closing of a tap that accompanies the use of water by a consumer as a water user will cause a sudden change in the pressure of water in piping that constitutes the water distribution block 520 of the pipeline network 500. This change is also called a water hammer as mentioned above. The water hammer may result also from operation of a pump 540, a valve 550 or a fire hydrant (not illustrated) or the like arranged at a point of the pipeline network 500. The water hammer propagates through water in piping.

The friction loss calculation unit 110 determines a friction loss of piping caused by a water hammer that has propagated through water in the piping, based on the transient change in water pressure measured by the pressure sensor 140-1 or 140-2.

As an example, the friction loss calculation unit 110 determines a friction loss of a pressure of a fluid in piping as described below. The friction loss calculation unit 110 determines a friction loss of a pressure of a fluid in piping by using the water pressure measured by the pressure sensor 140-1 or 140-2, based on a friction coefficient of the piping. A change in water pressure observed when a water hammer has occurred is represented by a motion equation of a water hammer indicated by equation 1 given below and an equation of continuity of water indicated by equation 2 given below. Note that the state of a water flow in piping is assumed as a turbulence in this example.

In equation 1 and equation 2, g represents an acceleration of gravity, A a cross-sectional area of piping, q a flow rate of water flowing in the piping, t a time, h a pressure of water in the piping represented by a water head, λ a friction coefficient of the piping, D the diameter of a distribution pipe, and a a propagation speed of a water hammer in the piping. x represents a distance of the piping in the longitudinal direction over which a friction loss is to be determined. Note that h is a dimension of length.

[Math 1]
$$\frac{1}{gA}\frac{\partial q}{\partial t}+\frac{\partial h}{\partial x}+\frac{\lambda}{2gDA^2}q|q|=0 \quad (1)$$

[Math 2]
$$\frac{gA}{a^2}\frac{\partial h}{\partial t}+\frac{\partial q}{\partial x}=0 \quad (2)$$

When equation 1 and equation 2 are satisfied simultaneously, the water pressure h is represented by equation 3 given below. Equation 3 represents a water hammer as a wave motion. Note that, in equation 3, γ represents a propagation constant, e a base of natural logarithm, j an imaginary unit, and w an angular frequency of a water hammer.

[Math 3]
$$h = K_0 e^{-\gamma x} K_1 e^{\gamma x} \quad (3)$$
wherein $$\gamma = \sqrt{\frac{j\omega}{a^2}\left(\frac{\lambda q}{DA}+j\omega\right)}, K_0, K_1$$

is constant

Note that γ represents a propagation constant. The propagation constant γ indicates a degree of attenuation or delay, depending on a distance, of a propagation waveform that propagates through water in piping. Assuming that α and β are real numbers and γ=α+jβ in equation 3, the friction coefficient is represented by equation 4. α represents an attenuation factor of a water hammer. The attenuation factor α has a frequency characteristic and is a function of the corresponding angular frequency ω. In other words, the friction coefficient is determined based on a speed of sound and an amplitude attenuation observed when a water hammer propagates through water. β is a function of a propagation speed of a water hammer.

[Math 4]
$$\lambda = \frac{2a\alpha DA}{q}\sqrt{1+(a\alpha/\omega)^2} \quad (4)$$

A time waveform of a water hammer measured by respective pressure sensors 140-1 and 140-2 are represented by $H_1+h_1$ and $H_2+h_2$. Here, $H_1$ and $H_2$ each represent a pressure that may be measured when water regularly flows in piping. $h_1$ and $h_2$ each indicate a magnitude of a change in water pressure, that is, a difference between the water pressure measured by the pressure sensor 140-1 or 140-2 when a water hammer has occurred and a pressure that may be measured when water regularly flows in piping. In this case, the aforementioned propagation constant γ is represented by equation 5 given below. In equation 5, L represents a distance between points where the pressure sensor 140-1 or 140-2 measures a water pressure.

[Math 5]
$$\gamma = -\frac{\log_e(h_2/h_1)}{L} \quad (5)$$

As mentioned above, $h_1$ and $h_2$ are determined based on measurement values determined by respective pressure sensors 140-1 and 140-2. L is determined depending on a position on piping where the pressure sensor 140-1 or 140-2 measures a pressure. Thus, the propagation constant γ is determined based on a ratio between magnitudes of changes in water pressure as measurement values determined by the pressure sensors 140-1 and 140-2.

α represents a real part of γ as mentioned above. In other words, a is represented by α=Re[γ]. α and ω included in equation 4 are determined based on equation 5. In equation 4, a that represents the propagation speed of a water hammer in piping is determined based on, for example, a difference in measurement time of day observed when the same water hammer is measured by the pressure sensor 140-1 or 140-2. a that represents the propagation speed of a water hammer in piping may be theoretically determined based on a characteristic or the like including a material of the piping or the diameter thereof.

Thus, a product of a friction coefficient λ and a flow rate q may be determined based on the measurement value or the like determined by the pressure sensor 140-1 or 140-2. In other words, the friction loss calculation unit 110 determines a product of a piping friction coefficient λ and a flow rate q by using equations 4 and 5, based on the measurement value determined by the pressure sensor 140-1 or 140-2.

The pressure sensor 140-1 or 140-2 may measure a plurality of water hammers. The friction loss calculation unit 110 is capable of determining a product of a piping friction coefficient λ and a flow rate q regarding a waveform by using one of the waveforms representing a plurality of water hammers measured by the pressure sensor 140-1 or 140-2. The product of the friction coefficient λ and the flow rate q thus determined may vary as a result of a difference in frequency component, waveform or amplitude or the like, or measurement error between a plurality of water hammers. As mentioned above, equation 4 includes w and a as functions of frequency. Thus, when the friction loss calculation unit 110 determines a product of a piping friction coefficient λ and a flow rate q, based on equation 4 and equation 5, λ may vary depending on a frequency component of a water hammer or the like.

Thus, the friction loss calculation unit 110 may correct the aforementioned measurement variations or frequency fluctuations assuming the friction coefficient of a regular flow as $\lambda_{eff}$. The corrected product of a friction coefficient $\lambda_{eff}$ and a flow rate q of a regular flow is represented by equation 6 given below. In equation 6, $C_1$ or $C_2$ represents a correction factor.

[Math 6]

$$\lambda_{eff} q = C_1 \lambda q + C_2 \tag{6}$$

Note that $\lambda_{eff}$ or a product of $\lambda_{eff}$ and q may be determined by using an equation different from equation 6 mentioned above. Alternatively, uncorrected λ may be used depending on the status of piping or a water hammer. While $\lambda_{eff}$ is used in the following description, λ may be used instead of $\lambda_{eff}$.

When a product of $\lambda_{eff}$ and q is determined, a flow rate q of a regular flow is determined by using the Darcy-Weisbach equation illustrated in equation 7 given below, based on $h_1$ and $h_2$ each indicating a magnitude of a change in pressure. In equation 7, Δh represents a degree of a decrease in the pressure of water between points where the pressure sensor 140-1 or 140-2 measures a pressure. In other words, equation 7 indicates a relationship between a difference in the pressure of water or the like in a pipeline or piping between two points and flow rates at the two points.

[Math 7]

$$\Delta h = H_1 - H_2 = \frac{\lambda_{eff} L}{2gDA^2} q |q| \tag{7}$$

In equation 7, the friction coefficient λ or $\lambda_{eff}$ depends on a flow rate. In other words, these values may vary as a result of a change in a flow rate of water in piping. Thus, The Hazen-Williams coefficient C indicated in equation 8 given below is determined by using the aforementioned $h_1$ and $h_2$ determined by respective pressure sensors 140-1 and 140-2 and the flow rate q determined via equation 7. Equation 8 indicates a relationship between a difference in pressure and a flow rate regarding water in a pipeline at two points. In equation 8, C is an example friction coefficient that does not depend on the flow rate of water. Further, C is a coefficient representing the smallness of a friction loss.

[Math 8]

$$\Delta h = 10.666 C^{-1.852} D^{-4.871} L q^{1.825} \tag{8}$$

The relationship between a pressure and a flow rate is determined by using the coefficient C determined via equation 8, based on the water pressure measured by the pressure sensor 140-1 or 140-2 for any flow rate. In other words, the friction loss calculation unit 110 is capable of determining the relationship between a pressure and a flow rate in a region between the pressure sensors 140-1 and 140-2 on piping and at surrounding points thereof, based on the water pressure measured by the pressure sensor 140-1 or 140-2. Thus, the friction loss calculation unit 110 is capable of determining a friction loss in a region between the pressure sensors 140-1 and 140-2 on piping and at surrounding points thereof, based on the water pressure measured by the pressure sensor 140-1 or 140-2.

The friction loss calculation unit 110 may construct a piping model, based on, for example, the friction loss determined as mentioned above. The piping model represents a friction loss at a point of the pipeline network 500. In other words, the friction loss calculation unit 110 constructs a piping model by determining the aforementioned Hazen-Williams coefficient C, based on the pressure determined by the pressure sensor 140 at a point of the pipeline network 500.

The diagnosing unit 120 diagnoses the state of the inner surface of piping, based on the friction loss of the pressure of the fluid in the piping determined by the friction loss calculation unit 110.

The inner surface of piping deteriorates over a long-term use of the piping. In other words, there occurs some problem with the inner surface of piping. Examples of deterioration of the inner surface of piping includes rust or clogging, corrosion of the inner surface, and an increase in surface irregularities. As the inner surface of piping deteriorates, a friction loss changes. When the inner surface of piping has started to deteriorate, a friction loss generally increases with a progress of deterioration. Accordingly, the diagnosing unit 120 diagnoses the state of the inner surface of piping, based on a magnitude of a friction loss or a temporal change in the magnitude of the friction loss.

The diagnosing unit 120 uses the aforementioned Hazen-Williams coefficient C as an example of a friction loss. In this case, the diagnosing unit 120 determines that a friction loss is large when the value of C is small.

As an example, the diagnosing unit 120 analyzes the state of the inner surface of a pipe, based on the friction loss of the pipe. In this example, the diagnosing unit 120 determines that the inner surface of piping has deteriorated when the friction loss satisfies a predetermined condition. The predetermined condition includes, for example, a case where the friction loss has increased beyond a threshold. In a case where the value of the Hazen-Williams coefficient C is used as a friction loss, it is determined that the inner surface of the piping has deteriorated when C has decreased beyond the threshold.

Figure 4A:
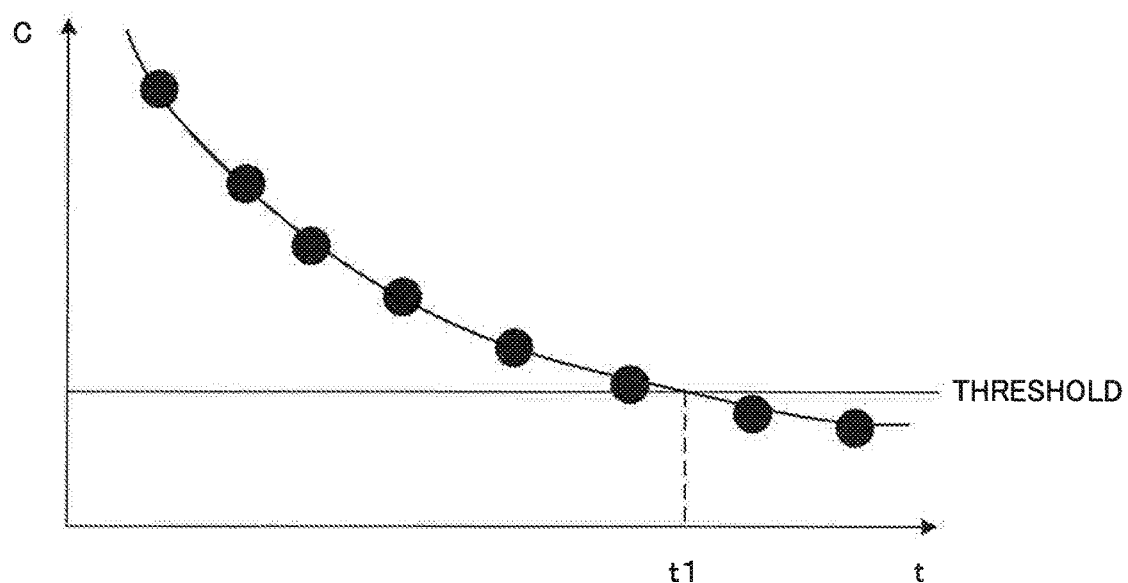
FIG. 4A illustrates an example of a change in friction loss observed when a diagnosis is made by the diagnostic device according to the first example embodiment of the invention.

FIG. 4A is a graph illustrating a friction loss observed when the state of the inner surface of a pipe is analyzed based on a friction loss of the pipe. In the graph of FIG. 4, the vertical axis indicates the Hazen-Williams coefficient C and the horizontal axis indicates the passage of time.

Generally speaking, a friction loss of piping increases or the Hazen-Williams coefficient C decreases, with the time that has passed since start of use. The friction loss of piping may reach the aforementioned threshold with the passage of time. In the example illustrated in FIG. 4A, C reaches a threshold at a time t1. Thus, the diagnosing unit 120 determines that the inner surface of the piping has deteriorated at the time t1.

The aforementioned threshold is statistically determined by using, for example, a friction loss of piping that has been actually measured. The threshold may be determined, based on a material or a bore of piping. Alternatively, the threshold may be determined, based on the material of the piping, a quality or a flow rate of water flowing in the piping, a soil in the periphery of the piping, or presence/absence of a stray current or the like.

It is preferable to be able to detect deterioration of piping of importance in an early stage in order to prevent a possible fault due to deterioration. Further, piping with a large flow rate suffers an energy loss due to a friction loss; it is preferable to be able to detect a large friction loss in an early stage. A threshold may be changed in order to early detect deterioration of such piping. For example, when the value of the Hazen-Williams coefficient C is used as a friction loss, a larger value of C than usually used may be employed as a threshold.

The diagnosing unit 120 may analyze the state of the inner surface of a pipe, based on a temporal change in the friction loss of the pipe. When the temporal change in the friction loss has suddenly increased beyond a predetermined condition, that is, when the value of the Hazen-Williams coefficient C has suddenly decreased beyond a predetermined condition, the diagnosing unit 120 determines that some abnormality has occurred in piping. Note that, the term abnormality used in this case means a sudden change, or a larger change than the ordinary progress of deterioration, in the state of the inner surface of the piping. The abnormality may be caused by, for example, clogging in piping or breakage of piping or the like. Piping may be inspected, for example, by a manager of piping or the like, based on the result of the above determination.

Generally speaking, an increase rate of a friction loss is relatively large immediately after start of use and gradually decreases with passage of time since start of use. In other words, a degree of a decrease in the Hazen-Williams coefficient C is relatively large immediately after start of use and gradually becomes smaller with passage of time since start of use, as illustrated in FIG. 4A mentioned above. However, some abnormality in piping may raise the increase rate of a friction loss.

Figure 4B:
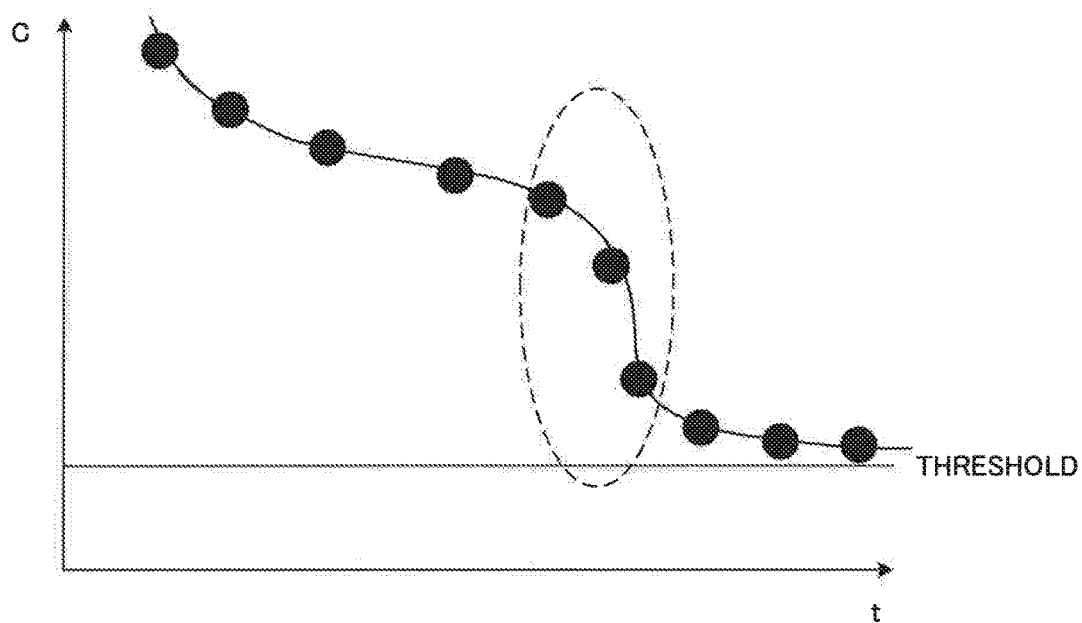
FIG. 4B illustrates an example of a change in friction loss observed when a diagnosis is made by the diagnostic device according to the first example embodiment of the invention.

An example of a change in the coefficient C in this case is illustrated in FIG. 4B. In FIG. 4B, an increase rate of a friction loss rises in most part of the portion surrounded by a closed dotted line. In this case, a value obtained by a second-order derivation of a temporal change in C has a negative value. Thus, the diagnosing unit 120 uses, as the aforementioned predetermined condition, a condition whether or not a value obtained by a second-order derivation of a temporal change in C has a negative value. The diagnosing unit 120, determines that some abnormality has occurred in piping when a value obtained by a second-order derivation of a temporal change in C has a negative value, as in most of the points in time surrounded by a closed dotted line in FIG. 4B for example.

Note that a different condition may be used as the aforementioned condition. The diagnosing unit 120 may determine that some abnormality has occurred in piping when, for example, in the case where an increase in friction loss or a decrease in C is represented by some approximation formula, when the increase or decrease in friction loss has deviated beyond a condition or the like determined based on the approximation formula. The aforementioned condition may be determined by statistically determining a temporal change in friction loss.

Further, the diagnosing unit 120 may predict a timing when the piping reaches a predetermined deteriorated state, by using a temporal change in friction loss and the aforementioned threshold regarding deterioration. For example, the diagnosing unit 120 predicts a timing when the friction loss of target piping reaches a preset threshold, based on a temporal change in friction loss. The diagnosing unit 120 predicts that the timing when the friction loss of the piping reaches a threshold corresponds to a timing when the piping reaches a predetermined deteriorated state. The threshold is determined based on a magnitude of a friction loss observed when piping reaches some state. In this case, the diagnosing unit 120 predicts a timing when piping reaches the state. For example, in the case where the threshold is determined based on the magnitude of a friction loss observed when, for example, target piping has deteriorated, the diagnosing unit 120 predicts a timing when the piping deteriorates. The magnitude of a friction loss observed when, for example, the piping has deteriorated, is determined by using a friction loss that has been actually measured regarding piping under similar conditions including the material or bore of the piping, the quality or flow rate of water flowing in the piping, and an environment in the periphery of the piping. The diagnosing unit 120 predicts a deteriorated state of piping in this way, which facilitates formulation of a repair schedule of the piping or the like.

As another example, the diagnosing unit 120 may analyze the state of the inner surface of piping, based on friction losses determined regarding a plurality of points in the pipeline network 500.

For example, the diagnosing unit 120 generates a probability distribution of a friction loss of a plurality of normal pipes such as newly laid pipes. Similarly, the diagnosing unit 120 generates a probability distribution of a friction loss of a plurality of pipes in which deterioration may be in progress, such as pipes that have been used for a prolonged period. When the friction loss of piping deviates from the distribution of a friction loss of normal piping, the diagnosing unit 120 determines that the inner surface of the piping has deteriorated. Note that data indicating the probability distribution of a friction loss of normal piping is generated previously and stored, for example, on the database 130 or the like. The diagnosing unit 120 obtains, as appropriate, the probability distribution of the friction loss, when analyzing the state of the inner surface of piping. The data indicating the probability distribution of the friction loss may be updated whenever the friction loss of normal piping is determined.

Figure 5:
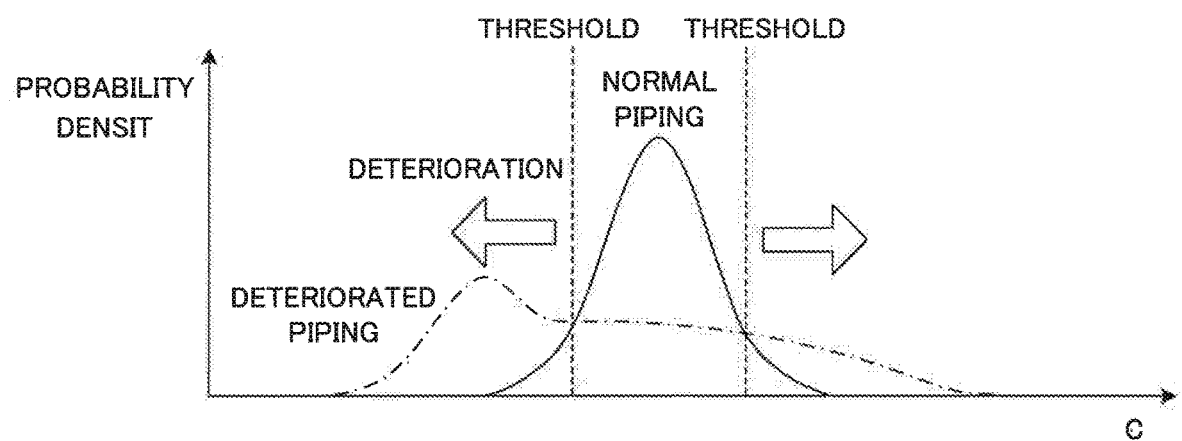
FIG. 5 illustrates an example of distribution of a friction loss observed when a diagnosis is made by the diagnostic device according to the first example embodiment of the invention.

FIG. 5 is an example of the aforementioned probability distribution. In the graph illustrated in FIG. 5, the horizontal axis indicates the Hazen-Williams coefficient C and the vertical axis indicates the probability density of C. The solid curve line indicates a distribution of C for normal piping and the alternate long and short dashed curve line indicates a distribution of C for piping in which deterioration may be in progress.

In the example illustrated in FIG. 5, a threshold is specified as illustrated, for example, with a dotted curve line. When C is determined, as a friction loss, by the friction loss calculation unit 110, the diagnosing unit 120 diagnoses whether or not the inner surface of the piping has deteriorated, based on whether or not C is within a threshold range. In other words, the diagnosing unit 120 determines that the inner surface of the piping has deteriorated when C is outside the threshold range, that is, when C is on a side indicated with an arrow mark in the graph of FIG. 5. When the probability distribution of a friction loss is updated, the threshold is updated depending on the probability distribution.

Figure 6:
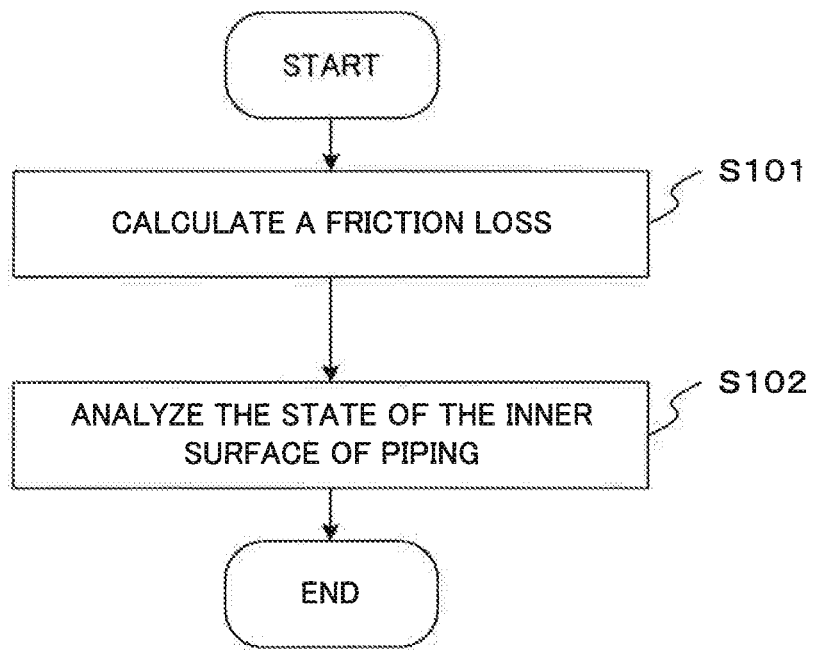
FIG. 6 is a flowchart illustrating an operation of the diagnostic device according to the first example embodiment of the invention.

Next, an operation of the diagnostic device 100 according to the first example embodiment of the invention will be described by using the flowchart illustrated in FIG. 6.

First, the friction loss calculation unit 110 determines a friction loss of a pressure of a fluid in piping, based on the water pressure in the piping determined by the pressure sensor 140-1 or 140-2 (step S101).

Next, the diagnosing unit 120 diagnoses the state of the inner surface of the piping, based on the friction loss determined in step S101 (step S102).

Note that, for example, when the diagnosing unit 120 makes an analysis on the basis of a temporal change in friction loss as mentioned above, or analyzes piping at a plurality of points of the pipeline network 500, the diagnostic device 100 repeats the aforementioned processing. When the diagnosing unit 120 makes an analysis on the basis of a temporal change in friction loss, the diagnostic device 100 repeats the aforementioned processing on piping at the same point. When the diagnosing unit 120 analyzes piping at a plurality of points of the pipeline network 500, the diagnostic device 100 repeats the aforementioned processing on piping at separate points.

As mentioned above, the diagnostic device 100 according to the first example embodiment of the invention diagnoses the state of the inner surface of piping, based on a friction loss of a pressure of a fluid such as water in piping. The friction loss changes with a progress of deterioration of piping including rust or clogging, corrosion of the inner surface, or an increase in surface irregularities. Thus, the diagnostic device 100 is capable of diagnosing, with high accuracy, deterioration of the inner surface of piping.

A friction loss of the pressure of a fluid in piping is determined, based on the pressure of the fluid in the piping. The pressure of a fluid in piping is determined, for example, by the pressure sensor 140 mounted on a fire hydrant or the like in the pipeline network 500, as mentioned above. In other words, the pressure is easily determined as compared with the flow rate of a fluid in piping or the like. Accordingly, the diagnostic device 100 according to the example embodiment is capable of easily determining the state of the interior of piping.

(Variation of the First Example Embodiment)

There may be a variation of the first example embodiment of the invention.

For example, the diagnostic device 100 may include the database 130 as mentioned above. The database 130 stores information indicating the friction loss determined by the friction loss calculation unit 110 or the result of a diagnosis made by the diagnosing unit 120. The result of the diagnosis of piping at a plurality of points made by the diagnosing unit 120 is stored on the database 130, which facilitates formulation of a repair schedule of piping or the like. For example, it is possible to formulate a schedule to replace deteriorated piping or piping of importance with spare on a preferential basis.

Second Example Embodiment

Figure 7:
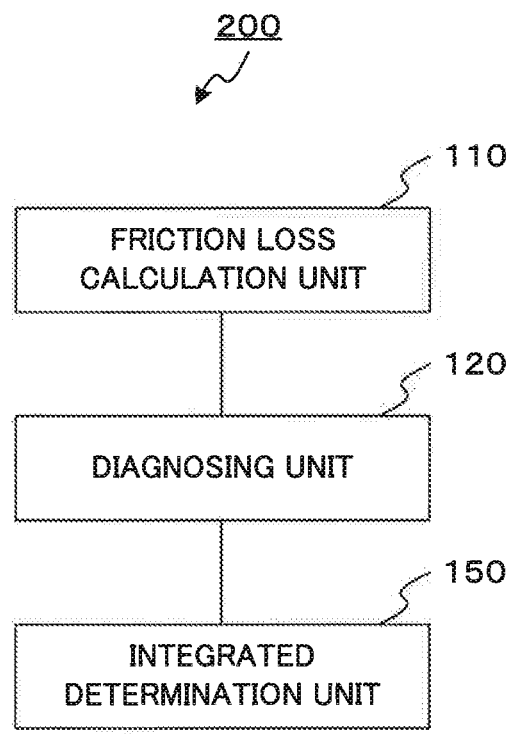
FIG. 7 illustrates a configuration of a diagnostic device according to a second example embodiment of the first example embodiment of the invention.

Next, a second example embodiment of the invention will be described below. FIG. 7 illustrates a configuration of a diagnostic device 200 according to the second example embodiment of the invention. The diagnostic device 200 according to the second example embodiment of the invention further includes an integrated determination unit 150 as compared with the diagnostic device 100 according to the first example embodiment illustrated in FIG. 1. The diagnostic device 200 may further include the aforementioned database 130.

The integrated determination unit 150 determines the state of piping, based on a friction loss and another index regarding the state of the piping. The other index may include, for example, a speed of sound in piping, a resonance frequency, a resonance sharpness or presence/absence of leakage, or the like. Note that any other index regarding piping that is different from the aforementioned indices may be used as the other index. The number of indices used by the integrated determination unit 150 for determination is not particularly limited. In other words, the integrated determination unit 150 may use, as the other index, a plurality of indices described above. The integrated determination unit 150 may use the result of the analysis made by the diagnosing unit 120.

In other words, the diagnostic device 200 according to the second example embodiment of the invention is configured to diagnose the state of piping by using the aforementioned friction loss and another index, than a friction loss, regarding the state of the piping.

The integrated determination unit 150 determines whether or not piping has deteriorated as an example of the state of the piping. When the piping has deteriorated, the integrated determination unit 150 may determine whether or not the piping has deteriorated on the whole or there is a particular problem with the piping. The integrated determination unit 150 determines the state of the piping, based on a friction loss and another index, for example, a deterioration degree index that has been obtained. The deterioration degree index may be obtained, for example, by weighting a friction loss and another index, and adding the individual weighted indices. Alternatively, the deterioration degree index may be determined by using an index such as a principal component analysis.

The integrated determination unit 150 determines that piping has deteriorated on the whole when the deterioration degree index indicates that there is a problem in terms of all indices of the piping, or when the friction loss and one or more of the other indices indicate that the piping has deteriorated, or the like. When the friction loss or any other index regarding the state of the piping indicates that the piping has deteriorated, for example when the deterioration degree index indicates that there is a problem in terms of a particular index, the integrated determination unit 150 determines that the piping has deteriorated in terms of an element regarding the particular index. When the integrated determination unit 150 uses the deterioration degree index for determination, the integrated determination unit 150 determines the state of the piping, based on whether or not a predetermined condition is satisfied. The predetermined condition is, for example, that the deterioration degree index has exceeded a preset threshold, or the like.

The aforementioned determination by the integrated determination unit 150 makes it possible to take measures depending on the state of piping. For example, when the integrated determination unit 150 determines that the piping has deteriorated on the whole, measures are taken, including replacement of the piping with spare.

On the other hand, when the diagnosing unit 120 determines that the state of the inner surface of piping has deteriorated while the other index or indices indicate that the piping is normal, the integrated determination unit 150 determines that the inner surface of the piping has deteriorated although the piping itself is normal, for example no cracks on the piping or wall thinning of the piping has occurred. Thus, in this case, for example, regeneration of the piping instead of replacement of the piping with spare improves the state of the piping. In other words, using the diagnostic device 200 according to the second example embodiment of the invention makes it possible to reduce costs or man-hours required for measures to be taken when the piping has deteriorated.

Third Example Embodiment

As another variation, the diagnostic device 100 may include a mechanism to output the result of an analysis or the like.

Figure 8:
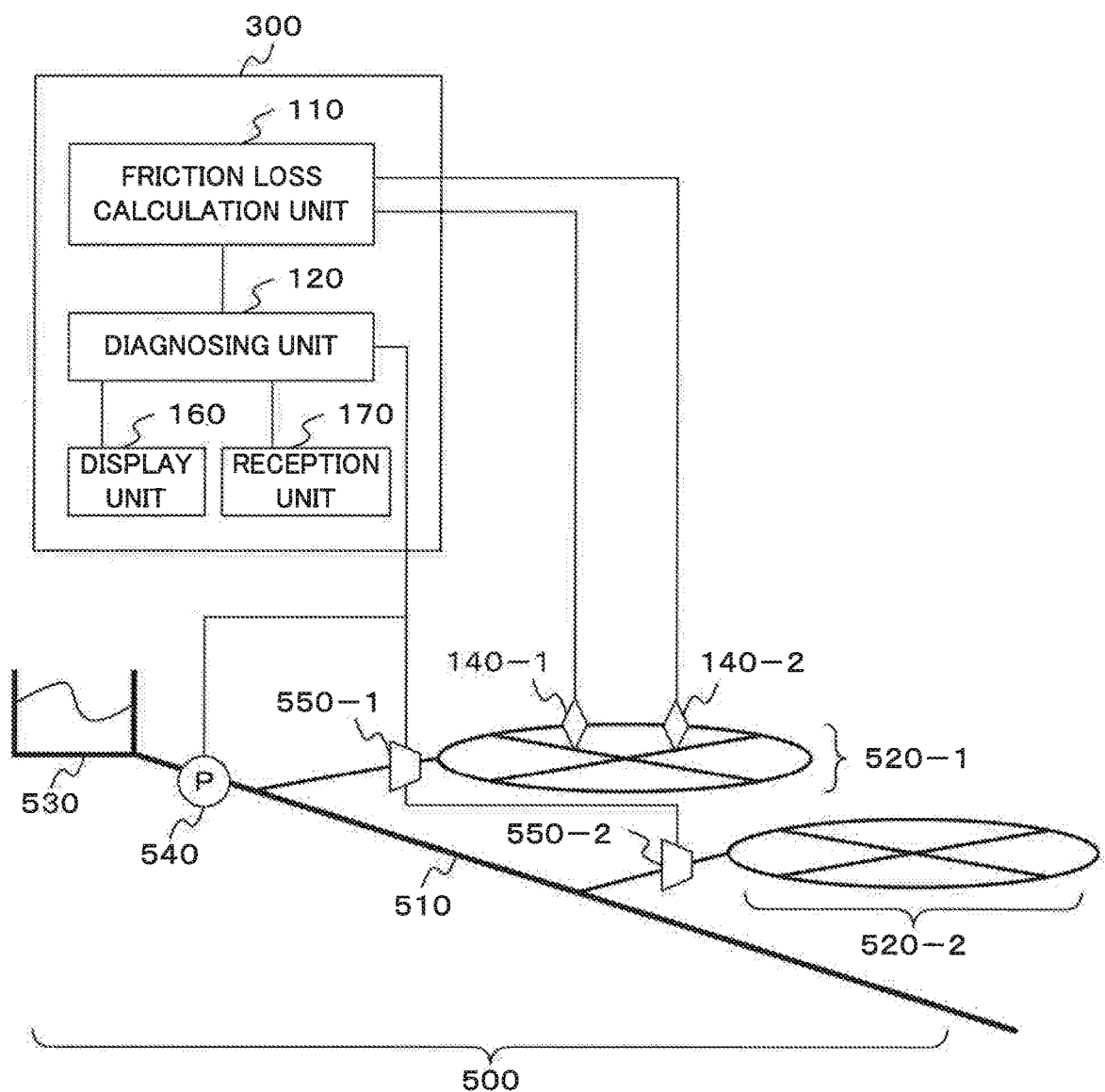
FIG. 8 illustrates an example of a diagnostic device according to a third example embodiment of the first example embodiment of the invention and a case where the diagnostic device is applied to a pipeline network of a water supply.

FIG. 8 illustrates a diagnostic device 300 according to a second example embodiment of the invention. The diagnostic device 300 according to the second example embodiment of the invention includes a friction loss calculation unit 110, a diagnosing unit 120, and a display unit 160. The display unit 160 displays the result of the analysis made by the diagnosing unit 120 or the like. The diagnostic device 300 may include a reception unit 170. The reception unit 170 receives an input regarding an analysis from a user of the diagnostic device 300. The diagnostic device 300 according to the example embodiment differs from the diagnostic device 100 according to the first example embodiment in that the diagnostic device 300 includes the display unit 160 and the reception unit 170.

In other words, the diagnostic device 300 according to the third example embodiment is configured to include a mechanism to output the result of an analysis or the like.

Note that the diagnostic device 200 may further include the aforementioned database 130. The diagnostic device 300 may include the integrated determination unit 150 in the diagnostic device 200 according to the second example embodiment of the invention.

In the example embodiment, the display unit 160 is embodied, for example, by a display or the like. The display unit 160 may be directly connected to the diagnosing unit 120 or connected thereto via a communication network (not illustrated). The reception unit 170 is embodied, for example, by a keyboard or a switch or the like. The reception unit 170 may be embodied by a touch panel integral with the display unit 160, or the like. When the reception unit 170 is arranged, the reception unit 170 may be directly connected to the diagnosing unit 120 or connected thereto via a communication network (not illustrated). The display unit 160 may be embodied by an aspect where necessary information is displayed on a display included in another information processing device including a personal computer (PC), a smartphone, a tablet or the like. The reception unit 170 may be embodied by an aspect where information is received from an input means included in these information processing devices.

In the example embodiment, the display unit 160 displays, for example, the result of the analysis regarding the state of the interior of piping determined by the diagnosing unit 120. The display unit 160 displays, for example, a degree of deterioration of piping. In this case, the display unit 160 may display the degree of deterioration in several stages or in numerical form.

The display unit 160 may further display the result of an analysis regarding a specific point of the pipeline network 500 or the result of an analysis regarding a plurality of points of the pipeline network 500, depending on the result of the analysis. In case the display unit 160 displays the result of an analysis regarding a plurality of points of the pipeline network 500, the display unit 160 may also display, for example, a part or a whole of the pipeline network 500. In this case, the display unit 160 may display, in emphasized form, a point where it is determined that the piping has deteriorated or principal piping.

The display unit 160 may display the result of the analysis made by the diagnosing unit 120 as well as the friction loss determined by the friction loss calculation unit 110.

The reception unit 170 receives information regarding whether or not an analysis is required or information regarding a point of the pipeline network 500 as a target of an analysis. When the display unit 160 displays the result of an analysis regarding a plurality of points of the pipeline network 500, the reception unit 170 may receive information specifying a point at which the detailed result of the analysis should be displayed.

When the diagnosing unit 120 continually diagnoses the state of the inner surface of piping at a point, the reception unit 170 may receive information specifying an interval of an analysis. When the diagnosing unit 120 predicts a timing when piping deteriorates, the reception unit 170 may receive an instruction regarding a point where a timing of deterioration should be predicted.

While the invention has been described with reference to example embodiments, the invention is not limited to the aforementioned example embodiments. Various changes readily understood by a person skilled in the art may be made to a configuration or a detail of an example embodiment within the scope of the invention. Configurations of an example embodiment may be combined with each other without departing from the scope of the invention.

The present application claims priority, based on Japanese Patent Application No. 2016-47002, filed on Mar. 10, 2016, the entire disclosure of which is incorporated herein.

REFERENCE SIGNS LIST 100, 200, 300 Diagnostic device
110 Friction loss calculation unit
120 Diagnosing unit
130 Database 140 Pressure sensor
500 Pipeline network
510 Water main
520 Water distribution block
530 Water purification plant
540 Pump
550 Valve
1000 Information processing device
1001 CPU
1002 ROM
1003 RAM
1004 Program
1005 Storage device
1006 Recording medium
1007 Drive device
1008 Communication interface
1009 Communication network
1010 Input/Output interface
1011 Bus

What is claimed is:

1. A diagnostic device comprising:
at least one memory storing instructions; and
at least one processor configured to execute the instructions for:
determining, based on a transient change in a pressure of a fluid in piping, a friction loss of the pressure caused by a water hammer occurrence in the piping, wherein the friction loss of the pressure is determined using an equation representing a relationship between the transient change of the pressure in the piping and the friction loss of the pressure; and
diagnosing a state of an inner surface of the piping, based on the friction loss,
wherein the at least one process is further configured to execute instructions for:
calculating a flow coefficient of a Hazen-Williams formula by using a water pressure difference and a flow rate; and
determining that an abnormality has occurred in the piping when a second-order derivative of the flow coefficient of the Hazen-Williams formula is negative.

2. The diagnostic device according to claim 1, wherein the at least one processor diagnoses the state of the inner surface of the piping, based on whether or not a magnitude of the friction loss satisfies a predetermined condition.

3. The diagnostic device according to claim 1, wherein the at least one processor diagnoses that the piping has deteriorated when a magnitude of the friction loss exceeds a predetermined threshold.

4. The diagnostic device according to claim 3, wherein the threshold is specified based on a probability distribution of a magnitude of the friction loss regarding normal piping.

5. The diagnostic device according to claim 4, wherein a probability distribution is updated when the friction loss regarding normal piping is determined.

6. The diagnostic device according to claim 3, wherein the at least one processor predicts a timing when the piping reaches a predetermined deteriorated state, based on a temporal change in the friction loss and the threshold.

7. The diagnostic device according to claim 1, wherein the at least one processor diagnoses the state of the inner surface of the piping, based on whether or not a temporal change in the friction loss satisfies a predetermined condition.

8. The diagnostic device according to claim 1, wherein the at least one processor diagnoses that the inner surface of the piping has got abnormal when a temporal change in the friction loss has increased beyond a predetermined condition.

9. The diagnostic device according to claim 8, wherein the predetermined condition regarding the temporal change is specified based on a rate of change of the temporal change.

10. The diagnostic device according to claim 1, the at least one processor is further configured to execute the instructions for determining the state of the piping, based on the friction loss and one or more other indices than the friction loss.

11. The diagnostic device according to claim 10, wherein the at least one processor diagnoses that the inner surface of piping has deteriorated when the at least one processor diagnoses that the inner surface of the piping has deteriorated and the one or more other indices indicate that the piping is normal.

12. The diagnostic device according to claim 10, wherein the at least one processor determines that the piping has deteriorated on the whole when the at least one processor diagnoses that the inner surface of the piping has deteriorated and at least one of the other indices indicates that the piping has deteriorated.

13. A diagnostic system comprising:
pressure acquirer for acquiring a pressure in piping at a plurality of points of the piping; and
the diagnostic device according to claim 1.

14. A diagnostic method comprising:
determining a friction loss of a pressure caused by a water hammer occurrence in piping, based on a transient change in the pressure of a fluid in the piping, wherein the friction loss of the pressure is determined using an equation representing a relationship between the transient change of the pressure in the piping and the friction loss of the pressure; and
diagnosing a state of the inner surface of the piping, based on the friction loss,
wherein the method further comprises:
calculating a flow coefficient of a Hazen-Williams formula by using a water pressure difference and a flow rate; and
determining that an abnormality has occurred in the piping when a second-order derivative of the flow coefficient of the Hazen-Williams formula is negative.

15. A non-transitory computer-readable recording medium storing a program for executing on a computer to perform a method:
processing to determine, based on a transient change in a pressure of a fluid in piping, a friction loss of the pressure caused by a water hammer occurrence in the piping, wherein the friction loss of the pressure is determined using an equation representing a relationship between the transient change of the pressure in the piping and the friction loss of the pressure; and
processing to diagnose, based on the friction loss, a state of the inner surface of the piping,
wherein the method further comprises:
calculating a flow coefficient of a Hazen-Williams formula by using a water pressure difference and a flow rate; and
determining that an abnormality has occurred in the piping when a second-order derivative of the flow coefficient of the Hazen-Williams formula is negative.

* * * * *